May 20, 1958  D. R. TROWBRIDGE ET AL  2,835,470

FLUID TURBINES

Filed Feb. 17, 1956

INVENTORS
DAVID R. TROWBRIDGE
NORMAN MOSS

William E. P. Bayly
BY
ATTORNEY

United States Patent Office 2,835,470
Patented May 20, 1958

2,835,470

FLUID TURBINES

David Roy Trowbridge, Ilford, and Norman Ross, London, England, assignors to The Plessey Company Limited, Ilford, England, a British company Application February 17, 1956, Serial No. 566,320

1 Claim. (Cl. 253—59)

This invention relates to turbines of the kind, hereinafter referred to as ram turbines, which are driven by a stream of fluid in which the turbine is immersed.

A typical example of the use of ram turbines is found in connection with aircraft where a ram air turbine can be used for providing power for actuating auxiliary equipment or the like, more particularly in the event of failure of the main turbine. The air turbine may be normally stowed away but when needed can be swung into the air stream to provide the power, thus enabling a pilot to operate the aircraft controls in an attempt to make a safe landing.

As the turbine must be designed to supply, even at low gliding speed, the maximum auxiliary power that may be required for operating the controls, its speed is liable to become excessive when the aircraft speed is high and/or little or no auxiliary power is consumed.

According to the invention means are provided which, when the turbine speed rises above normal, reduces the cross-section of an aperture through which the fluid driving the turbine must pass.

For this purpose one or more radially movable baffles may be provided together with means for controlling the radial position of the baffles according to the speed of the turbine. The baffles may be actuated by various means, for example by mechanical means such as a governor device, or electrically, electro-mechanically, or hydraulically. The mechanical or hydraulic means are preferably driven from the turbine; in the case of electrical and electro-mechanical means the electric power may be either obtained from a generator driven by the turbine or from an independent electric supply.

The baffle plates may be slidably mounted between two side plates which may be part of the rotating or stationary members of the turbine, means being provided for imparting movement to said baffle plates relative to the side plates, whereby as the speed of the turbine increases or decreases the baffles move into or out of the stream of gas or vapour passing through the turbine.

The invention will now be described with reference to the accompanying drawing in which—

Figure 1:
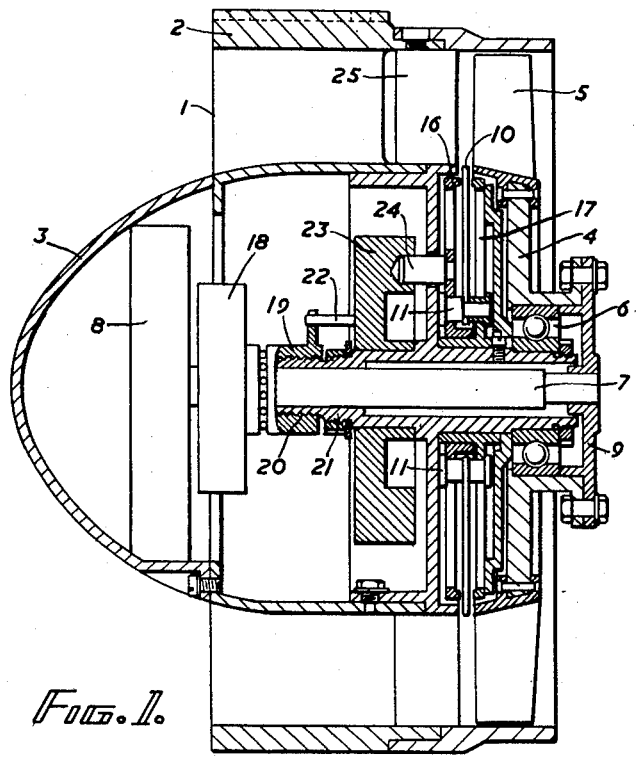
Figure 2:
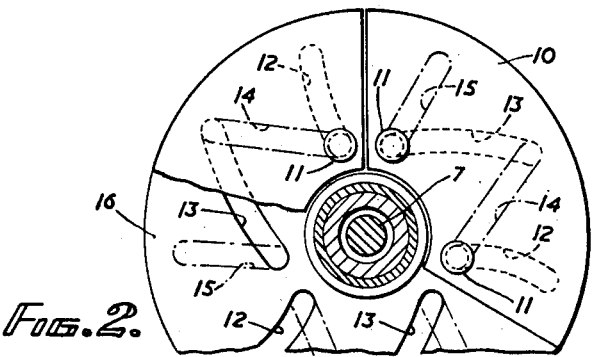

Fig. 1 is a sectional elevation of a ram air turbine which is adapted to be brought into the airstream around an aircraft, and Fig. 2 is a diagram including an axial view of the obturator segments.

Referring first to Fig. 1, an annular air duct 1 is formed between a substantially cylindrical wall 2 and an inner housing 3 which is so shaped as to cause, when facing a stream of air, as much as possible of the oncoming air to pass through the duct 1 and reach the duct with as little turbulence as possible. A rotor 4 fitted with turbine blades 5 extending across the duct 1 is carried by a ball bearing 6 secured on the housing 3, and a shaft 7, for example the power-input shaft of a hydraulic pump 8, is coupled with the rotor 4 by a coupling flange 9. In order to prevent the turbine speed from rising unduly when the aircraft moves at high speed and/or the hydraulic load is light, a set of obturator or baffle segments 10 are provided which are arranged in a plane slightly in front of the inlet edges of the rotor blades 5 and are normally accommodated within the housing 3 so as not to interfere with the flow of air through the turbine. Each segment carries two pins 11, and the two ends of each pin 11 engage respectively grooves or slots 12 or 13 and 14 or 15 of two side plates 16 and 17 arranged in the housing 3. The side plate 17 is fixed in the housing 3, while the other side plate 16 is adjustably rotatable. As will be seen from Fig. 2, rotation of the plate 16 will displace the points of intersection, in an axial projection, of the grooves or the like 12 and 13 of plate 16 with the grooves or slots 14 and 15 respectively of plate 17 will move inwardly or outwardly, according to the direction in which plate 16 is rotated, thus causing the segments 10 to move out into passage 1 to reduce the quantity of air passing through the same, or conversely be withdrawn from the passage.

In order to adjust plate 16 automatically, a centrifugal governor 18 acts through a ball thrust bearing to displace a nut 19 axially relative to the shaft 7. This nut engages a quick-pitch thread 20 provided on the outer surface of a sleeve 21 fixed in the housing 3, whereby the nut 19 is rotated by an angle corresponding to its axial displacement. This rotation of the nut 19 is transmitted by coupling means 22, 23, 24 to the disc 16, which is thus rotated by an angle corresponding to the axial displacement of the nut 19 and thus to the speed of the governor 18.

The resulting angular displacement of the disc 16 relative to the stationary disc 17 causes points of intersection of the slots 13 and 15 and of the slots 12 and 14 to move away from the axis of shaft 7, due to the angle which these slots form with each other, and the pins 11, in order to remain in simultaneous engagement with the slots in both of the discs 16 and 17, must move outwardly with these points of intersection, thereby forcing the segments 10 to move outwardly into the annular passage 5 to an extent depending on the amount of excess speed of the turbine. As a result the air stream entering the turbine blades is throttled, thus keeping the rise of the turbine speed low. In the illustrated embodiment a ring of stationary, nozzle-forming blades 25 is provided in the passage in a manner described in more detail in our co-pending British patent application No. 3,407/56 and the flow-control segments 10 are arranged in a gap 26 between the nozzle blades 25 and the rotor blades 5.

What is claimed is:

In an air driven turbine the combination of an air speed control means comprising a housing consisting essentially of an outer cylindrical wall and an inner housing with an annular air duct therebetween, a rotor fitted with turbine blades extending across the air duct, a set of baffle segments arranged in a plane in front of the inlet edges of said rotor; each of said baffle segments moving radially through a pin and slot connection, a centrifugal governor driven by the air turbine, and automatic means operatively connected to said baffle segments and centrifugal governor comprising stationary and rotary discs each having cam slots therein, and further comprising the pins of said cam and slot connections, each pin being fixed to a baffle segment and extending into a pair of said cam slots in said stationary and rotary discs, for moving the baffle segments radially across the air duct passage, said baffle segments normally accommodated within said inner housing thereby providing a clear passage to the air inlet duct in said housing.

(References on following page)

References Cited in the file of this patent

UNITED STATES PATENTS

| | | |
|---|---|---|
| 329,567 | Kahl | Nov. 3, 1885 |
| 2,140,148 | Whitmore | Dec. 13, 1938 |
| 2,651,493 | Volk | Sept. 8, 1953 |
| 2,737,897 | Dewees | Mar. 13, 1956 |
| 2,752,858 | Berges | July 3, 1956 |

FOREIGN PATENTS

| | | |
|---|---|---|
| 479,889 | Great Britain | Feb. 14, 1938 |
| 1,010,604 | France | Mar. 26, 1952 |